United States Patent Office 3,436,461
Patented Apr. 1, 1969

3,436,461
USE OF ALKYLGUANIDINE SALTS
AS VIRUCIDES
Frank Scotti, Wayne, N.J., assignor to American Cyanamid Company, Stamford, Conn., a corporation of Maine
No Drawing. Continuation-in-part of application Ser. No. 571,694, Aug. 11, 1966. This application Jan. 17, 1968, Ser. No. 698,388
Int. Cl. A61k 27/00
U.S. Cl. 424—315                              5 Claims

ABSTRACT OF THE DISCLOSURE

A method of inactivating lipophilic viruses such as Influenza A and *Herpes simplex* by contacting the virus with an alkylguanidine salt of the formula:

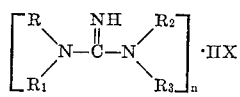

where R is a long chain aliphatic hydrocarbon radical of from 8 to 18 carbon atoms; $R_1$, $R_2$ and $R_3$ are hydrogen or R; X is an anionic salt forming group; and $n$ is 1, 2 or 3. Typical salts are dodecylguanidine acetate or hydrochloride.

---

This application is a continuation-in-part of Ser. No. 571,694 filed Aug. 11, 1966, now abandoned.

This invention relates to the use of alkylguanidine salts as virucides.

Viruses are not homogeneous in their susceptibility to given bactericides and the virucidal activity of a given bactericide cannot be reasonably predicted. Therefore, known bactericides have not been extensively employed as virucides.

The virucidal alkylguanidine salts of the present invention may be represented by the following formula:

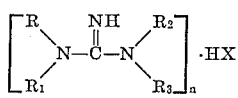

wherein R is a long chain aliphatic hydrocarbon radical of from 8 to 18 carbon atoms, inclusive; $R_1$, $R_2$, and $R_3$ (same or different) are selected from the group consisting of hydrogen and R; X represents an anionic salt forming group; and $n$ represents an integer from 1 to 3, the specific value of $n$ depending on the acid used to prepare the salt. For example, when a dibasic acid is used, $n$ in the above formula is 1 or 2.

With regard to the aliphatic constituents of the above formula, long chain radicals of from about 10 to 16 carbon atoms are preferred. Furthermore, when employing an alkylguanidine containing an aliphatic constituent of particular chain length, the compound utilized need not be comprised exclusively of constituents of said chain length, but may be composed of aliphatic constituents of varying chain length, the average of same being approximately that of the particular chain length of the aliphatic constituent of the alkylguanidine to be employed. In addition, mixtures of alkyl and alkenyl guanidine may be used, thereby obviating the necessity of resorting to the expense of separation procedures. While the term "alkylguanidine" is employed throughout this description, the term is intended to include such compounds wherein the long chain hydrocarbon radical is alkenyl or formed from a mixture of alkyl and alkenyl.

Acids used to form the salts include both organic and inorganic acids, whether monobasic or polybasic, such as the following but are not limited thereto:

| | |
|---|---|
| Acetic | Phthalic (tere-, iso-) |
| Propionic | Benzoic |
| Butyric | Naphthoic |
| Valeric | Carbonic |
| Caproic | Bicarbonic |
| Caprylic | Boric |
| Lauric | Hydrochloric |
| Capric | Nitric |
| Stearic | Phosphoric |
| Lactic | 2-ethyl hexanoic |
| Malic | Sulfuric |
| Maleic | |

The alkylguanidine salts are known compounds as disclosed, for example, together with other uses, in U.S. Patent 2,906,595 to Pelcak and Dornbush.

It has been discovered that the aforementioned alkylguanidine salts are effective virucidals at concentrations as low as 50 parts per million. For example, a 400 parts per million dodecylguanidine solution completely inactivated cultures of *Herpes simplex* and Influenza A after 1 minute of contact time. This result is completely unexpected when considering the concentration and time necessary for inactivation. While the alkylguanidines of the present invention are effective at 200 parts per million, a preferred concentration of about 500 parts per million or higher is recommended to insure effectiveness at various levels of contamination.

The preferred alkylguanidine salts are those which are wholly or partly soluble in water or alcohol or admixtures, since these solvents are the usual application media. Of these salts, dodecylguanidine acetate or hydrochloride are preferred because of their effectiveness, availability and low cost. Typical alcohols are the water-miscible alcohols such as ethanol and isopropanol. In addition, the composition may also contain suitable surfactants, as well as phenolic type germicides.

Many advantages have inured to the art as a consequence of the present invention. A particular advantage is realized since the present invention provides an inexpensive expendient for use in homes, offices, and factories to prevent the spread of viral diseases, particularly influenza. An added advantage resides in the fact that the compositions of the present invention do not possess the noxious odors of many of the known sanitizing solutions.

In addition to sanitizing areas to control the spread of viral contamination, a further application resides in the incorporation of the alkylguanidines of the present invention in hospital apparel, linens and the like. Moreover, as a consequence of the cationic nature of the alkylguanidines, the salts are effective adsorbed on anionic substrates such as paper, thereby enabling the incorporation of said alkylguanidines in disposable paper such as dental bibs, towels, wipes and the like. The alkylguanidines of the present invention may also be incorporated in other paper products, employing a concentration of 150–200 parts per million, or formulated with inert carriers such as clays. In addition, the alkylguanidine salts may be formulated as concentrates, which are diluted to the proper concentration prior to use. A concentrate containing 10% of the alkylguanidine in a hydroalcoholic solvent is preferred.

Viruses controlled by application of the alkylguanidine salts are of the lipophilic type as defined by Noll and Youngner, Virology, 8:319–343 (1959). These are viruses which combine with lipids such as cholesterol. The viruses which do not readily combine with lipids are called hydrophilic viruses. Examples of hydrophilic viruses are polioviruses, coxsackie, and Echo viruses. Examples of lipophilic viruses are the Myxoviruses (e.g., Influenza A, Influenza B, Asian Influenza, Parainfluenza Type 3), Herpes viruses (e.g., *Herpes simplex*), Pox viruses (e.g., Vaccinia), Arboviruses (e.g., encephalitis viruses), and Adenoviruses (e.g., Adenovirus Type 2). Although the Adenoviruses do not have lipid envelopes, they are classified as lipophilic because they are adsorbed with lipids.

It is significant that Echovirus 11, a hydrophilic virus, is not inactivated by the alkylguanidine salts. While not fully understood, it is believed that the lipophilic nature of the long chain hydrocarbon radical of the alkylguanidine salts, being lipophilic, promotes penetration through the lipid envelope or environment of lipophilic viruses, thereby facilitating contact with the virus. In the case of Echovirus 11, the long chain hydrocarbon radical of the alkylguanidine salt apparently is incompatible with the virus and cannot penetrate the viral cell wall.

The following examples are provided for illustrative purposes and include particular features of the invention; however, the examples should not be construed as limiting the invention, many variations of which are possible without departing from the spirit or scope thereof.

EXAMPLE 1

A 400 p.p.m. dodecylguanidine acetate (DGA) solution is prepared by dissolving 80 milligrams of the salt in 200 milliliters warm distilled water and tested for activity against Influenza A virus as follows.

In a direct contact test, 0.5 milliliter of the virus is diluted in 4.5 milliliters of DGA solution and held at room temperature (approx. 22° C.) for 10 minutes. Serial dilutions of the mixture are then made for inoculation into rhesus monkey kidney cultures. The test is read by hemadsorption. As a control, 0.5 milliliter of the virus is diluted in 4.5 milliliters Earle's lactalbumin hydrolysate medium and treated as just described. In the hemadsorption test, the cell culture tubes, three days after inoculation, are washed twice with 1.0 milliliter phosphate buffered saline (PBS). One milliliter of 0.4% guinea pig erythrocytes is added to each tube. The tubes are then incubated 20 min. at 4° C. and washed with 1.0 milliliter PBS. The erythrocytes adsorb to the monkey kidney cells that are infected with influenza.

The virus potency after treatment with DGA, expressed as log $TCID_{50}$/ml., is found to be less than 2.2 as compared with 6.0 for the control, thus demonstrating complete inactivation of Influenza A virus within the limits of the test.

EXAMPLE 2

In a test conducted substantially as described in Example 1, the virus potency after treatment with dodecylguanidine hydrochloride at 400 p.p.m. against Influenza A, expressed as log $TCID_{50}$/ml., is found to be less than 3.2 as compared with 6.0 for the control, thus demonstrating complete inactivation of the virus within the limits of the test.

EXAMPLE 3

A 400 p.p.m. dodecylguanidine acetate (DGA) solution is prepared by dissolving 80 grams of the salt in 200 milliliters warm distilled water and tested for activity against *Herpes simplex* virus as follows.

In a direct contact test, 0.5 milliliter of the virus is diluted in 4.5 milliliters of DGA at 400 p.p.m. and held at room temperature (approx. 22° C.) for 10 minutes. Serial dilutions of the mixture are then made for inoculation into BS–C–1 cell cultures. The test is read by viral cytopathology. As a control, 0.5 milliliter of the virus is diluted in 4.5 milliliters Earle's lactalbumin hydrolysate medium and treated as just described.

The virus potency of DGA after treatment with DGA, expressed as log $TCID_{50}$/ml., is found to be less than 4.2 as compared with 6.9 for the control. It is therefore demonstrated that DGA completely inactivates *Herpes simplex* within the limits of the test.

EXAMPLE 4

In substantially the same test as Example 3, the virus potency after treatment with dodecylguanidine hydrochloride, expressed as log $TCID_{50}$/ml., is found to be less than 4.2, thus demonstrating complete inactivation of the virus within the limits of the test.

EXAMPLE 5

A 400 p.p.m. dodecylguanidine acetate (DGA) solution is prepared by dissolving 80 milligrams of the salt in 200 milliliters of warm distilled water. Three dilutions at 200, 100 and 50 p.p.m. are then made from this solution. The activity of each dilution against Parainfluenza Type 3 is determined as follows.

In a direct contact test, 0.5 milliliter of the virus is diluted in 4.5 milliliters of DGA solution and held at room temperature (approx. 22° C.) for 10 minutes. Serial dilutions of the mixture are then made for inoculation into rhesus monkey kidney cultures. The test is read by hemadsorption. As a control, 0.5 milliliter of the virus is diluted in 4.5 milliliters Earle's lactalbumin hydrolysate medium and treated as just described. In the hemadsorption test, the cell culture tubes, three days after inoculation, are washed twice with 1.0 milliliter phosphate buffered saline (PBS). One milliliter of 0.4% guinea pig erythrocytes is added to each tube. The tubes are then incubated 20 min. at 4° C. and washed with 1.0 milliliter PBS. The erythrocytes adsorb to the monkey kidney cells that are infected with influenza.

The virus potency after treatment with DGA, expressed as log $TCID_{50}$/ml., is found to be less than 2.2 for each of the three DGA dilutions as compared with 5.7 for the control. It is therefore demonstrated that DGA at a concentration of 50 p.p.m. completely inactivates Parainfluenza Type 3 virus within the limits of the test. Similarly, dodecylguanidine hydrochloride is found effective at 400 p.p.m.

EXAMPLE 6

A dodecylguanidine acetate (DGA) solution at 400 p.p.m. is prepared as described in Example 1 and tested for activity against Adenovirus Type 3 as follows.

In a direct contact test, 0.5 milliliter of the virus is diluted in 4.5 milliliters of DGA at 400 p.p.m. and held at room temperature (approx. 22° C.) for 10 minutes. Serial dilutions of the mixture are then made for inoculation into rhesus monkey cultures. The test is read by viral cytopathology. As a control, 0.5 milliliter of the virus is diluted in 4.5 milliliters Earle's lactalbumin hydrolysate medium and treated as just described.

The virus potency after treatment with DGA, expressed as log $TCID_{50}$/ml., is found to be less than 3.2 as compared with 5.4 for the control. It is therefore demonstrated that DGA completely inactivates Adenovirus Type 3 within the limits of the test.

EXAMPLE 7

In a test conducted substantially as described in Example 5, the virus potency after treatment with dodecylguanidine hydrochloride at 400 p.p.m. against Adenovirus Type 3, expressed as log $TCID_{50}$/ml., is found to be less than 3.2 as compared with 5.4 for the control, thus demonstrating complete inactivation of the virus within the limits of the test.

EXAMPLE 8

A dodecylguanidine acetate (DGA) solution at 400 p.p.m. is prepared as described in Example 1 and tested for activity against Influenza B as follows.

In a direct contact test, 0.5 milliliter of the virus is diluted in 4.5 milliliters of DGA at 400 p.p.m. and held at room temperature (approx. 22° C.) for 10 minutes. Serial dilutions of the mixture are then made for inoculation into rhesus monkey cultures. The test is read by hemadsorption. As a control, 0.5 milliliter of the virus is diluted in 4.5 milliliters Earle's lactalbumin hydrolysate medium and treated as just described.

The virus potency after treatment with DGA, expressed as log $TCID_{50}$/ml., is found to be less than 3.2 as compared with 5.2 for the control. It is therefore demonstrated that DGA completely inactivates Influenza B within the limits of the test.

EXAMPLE 9

In a test conducted substantially as described in Example 8, the virus potency after treatment with dodecylguanidine hydrochloride at 400 p.p.m. against Influenza B, expressed as log $TCID_{50}$/ml., is found to be less than 3.2 as compared with 5.2 for the control, thus demonstrating complete inactivation of the virus within the limits of the test.

EXAMPLE 10

The procedures of the foregoing examples are repeated, with the exception that dodecylguanidine acid phthalate and dodecylguanidine terephthalate are substituted for dodecylguanidine acetate. In each instance the compounds demonstrate a virucidal effect substantially similar to dodecylguanidine acetate.

I claim:

1. A method of controlling a lipophilic virus which comprises contacting said virus with a guanidine salt of the formula:

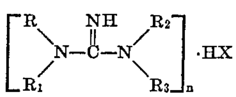

where R is a long chain aliphatic hydrocarbon radical of 8 to 18 carbon atoms; $R_1$, $R_2$ and $R_3$ are hydrogen or R; X is an anionic salt forming group; and *n* is 1, 2 or 3.

2. The method of claim 1 wherein $R_1$, $R_2$ and $R_3$ are hydrogen and R contains 10 to 16 carbon atoms.

3. The method of claim 1 wherein the guanidine salt is dodecylguanidine salt.

4. The method of claim 3 wherein the salt is the acetate.

5. The method of claim 3 wherein the salt is the hydrochloride.

References Cited

UNITED STATES PATENTS

| | | |
|---|---|---|
| 3,116,326 | 12/1963 | Lamb. |
| 3,142,615 | 7/1964 | Wehner. |
| 3,264,172 | 8/1966 | Regutti. |

FOREIGN PATENTS

| | | |
|---|---|---|
| 1,085,374 | 7/1960 | Germany. |
| 180,884 | 9/1962 | Sweden. |

OTHER REFERENCES

Brotzv et al.: Giorn. Ital. Chemoterap., 10(1), 1963, pp. 11–14.

ALBERT T. MEYERS, *Primary Examiner.*

J. GOLDBERG, *Assistant Examiner.*

U.S. Cl. X.R.

424—185, 224, 326